March 5, 1957 W. H. CHERRY 2,784,256

BANDWIDTH REDUCTION SYSTEM

Filed Jan. 25, 1951 2 Sheets-Sheet 1

INVENTOR
William H. Cherry
BY
ATTORNEY

INVENTOR
William H. Cherry
BY
ATTORNEY

United States Patent Office 2,784,256

Patented Mar. 5, 1957

2,784,256

BANDWIDTH REDUCTION SYSTEM

William H. Cherry, Princeton, N. J., assignor to Radio Corporation of America, a corporation of Delaware Application January 25, 1951, Serial No. 207,815

2 Claims. (Cl. 179—15.6)

Figure 1:
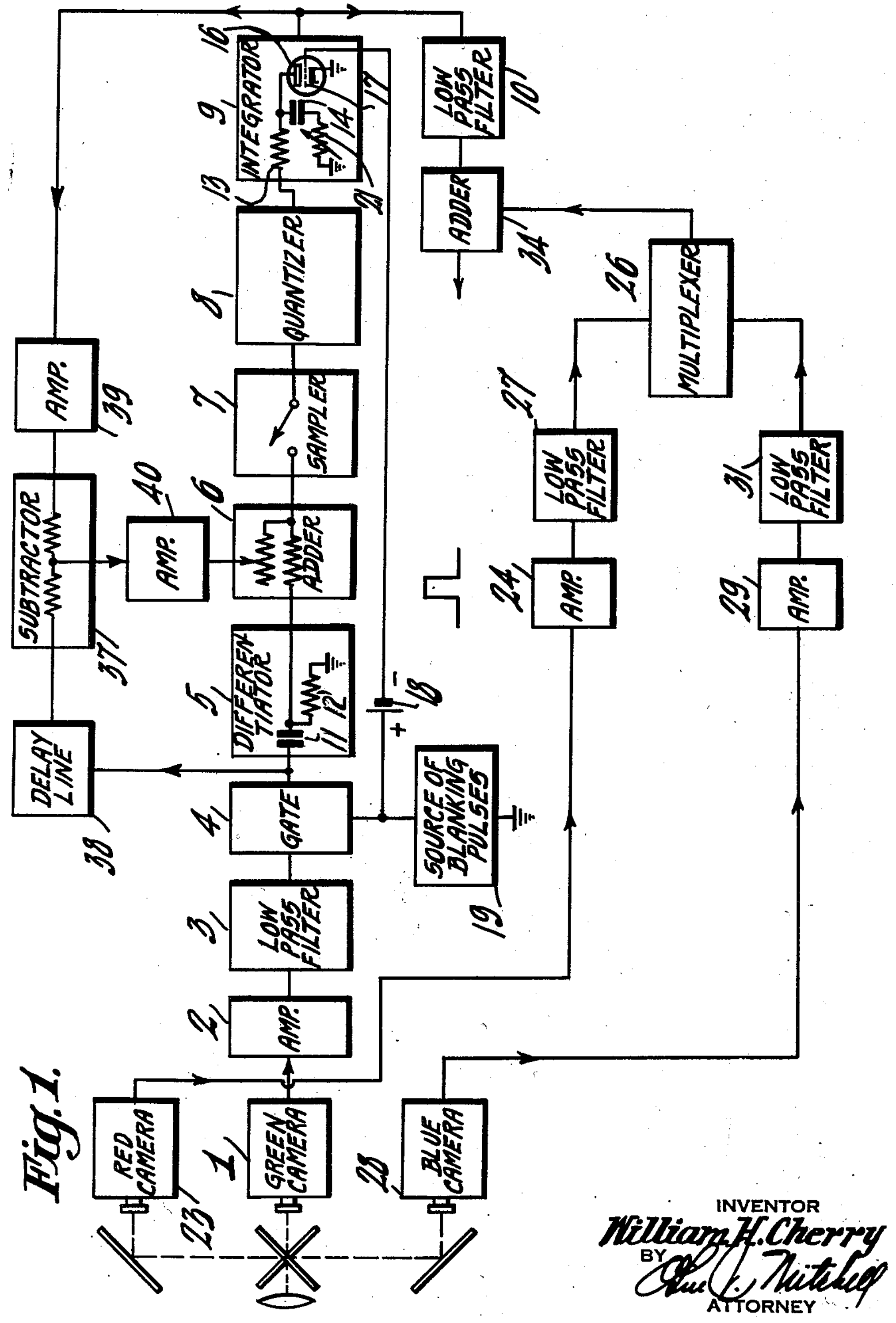

This invention relates to an improved system for conveying intelligence. In particular, it relates to a signal multiplex system wherein the derivative or other alteration of the phase and amplitude versus frequency characteristic of one of a plurality of different intelligence signals to be transmitted is quantized.

It is often both technically and economically desirable to reduce or to minimize the frequency bandwith required for the transmission of information through a communication channel, and this is especially true in the field of color television. The present invention constitutes an advance in that direction which is particularly well adapted for use in color television. It will be explained in connection with a color system although its application is clearly not limited thereto.

Hitherto, two general approaches to the problem of bandwidth minimization or maximization of information handling capacity have been used, either singly or in combination. The first of these is the elimination of excess, unnecessary, or easily dispensable information. The second approach is known as coding or, as it is usually applied when continuous signals are involved, amplitude quantization.

As quantizing is applied to color television, it is customary to limit the transmitted intensity variations of one of the colors to one or another of a plurality of discrete levels. Any intensity variations of this color lying between two levels are represented by a signal having a value that corresponds to the nearest quantum level. Whereas the eye is not sensitive to the loss in intensity information of a single color in small areas, changes from one intensity level to another in large areas cause a deterioration of the image known as puddling. Thus, if the rouge on the cheek of an actress lies in one quantum level and the surrounding part of the face lies in another quantum level, the rouge would not appear as being gradually shaded, but would appear as a spot of single intensity. The effect of puddling may be reduced by using sufficient number of quanta levels. However, with the increase in the number of quanta levels, the effect of noise on the hue reproduced is increased.

Due to the fact that quantizing only permits transmission of selected discrete levels of intensity of the component colors, inaccuracies result because the hues having intensities of color between these selected discrete levels cannot accurately be reproduced.

It is therefore an object of this invention to minimize puddling in quantized color television systems.

It is a further object of the invention to provide an improved quantizing system including transmitters and receivers wherein puddling is minimized without increasing the susceptibility of the system to noise.

It is still a further object of this invention to provide an improved quantizing system including transmitters and receivers wherein all hues and chromas of the color information may be transmitted.

In accordance with the principles of this invention, the above objectives are obtained by differentiating at least one of the multiplexed signals to be transmitted and quantizing the derivative thus obtained. This derivative may be transmitted directly or be integrated before transmission. If the differentiated signal is transmitted, the television receivers must be equipped with an integrating circuit at the output of their second detector in order to recover the original signal. In the case where the differential is integrated, however, the signals transmitted correspond substantially with present day television standards and may be converted into monochrome images with present day black and white receivers.

There are physiological reasons why quantizing the derivative of one of the signals in a color television system provides a basis for obtaining the above objectives.

Whereas the eye's acuity for changes in intensity and for distinguishing between hues even in small areas is rather marked, its acuity for the way in which the intensity or hue goes from one level to another is rather weak. In other words, it can be said that the eye's acuity for the first derivative or rate of change of intensity or hue of a video signal is not very great. In a color television system, constructed in accordance with the principles of this invention, therefore, the eye may see all the intensities and hues of the different colors to which it is very sensitive, but will not notice the rate of change from one intensity to another or from one hue to another.

Figure 2:
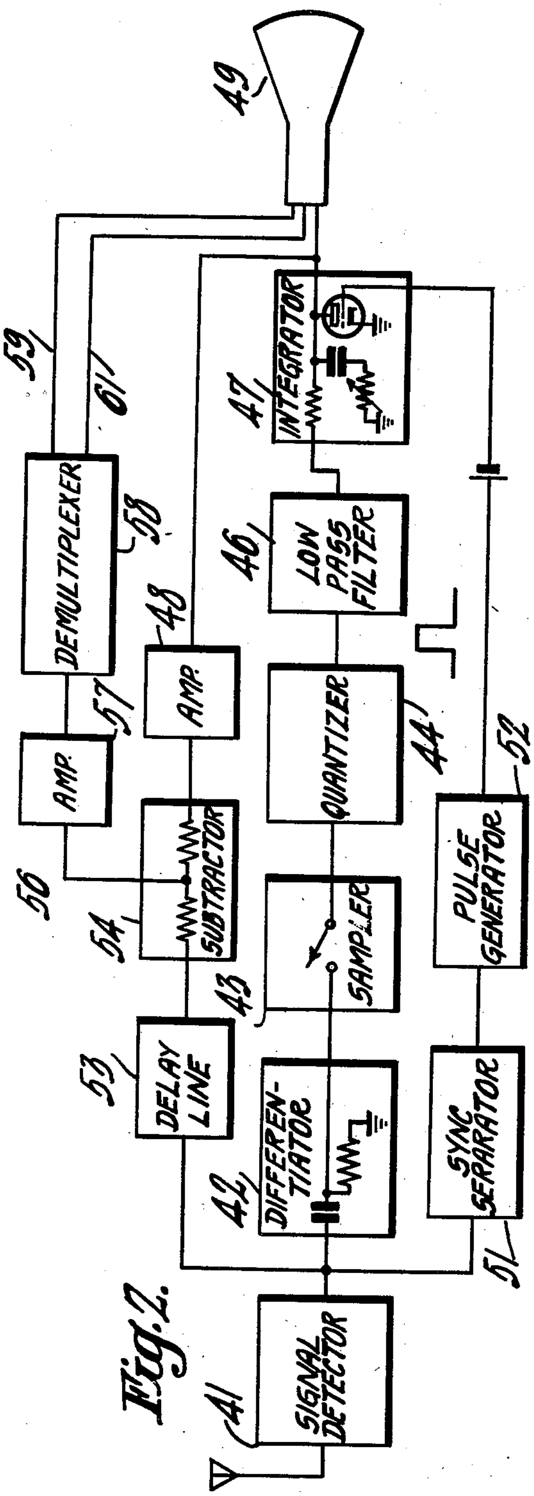
Figure 3:
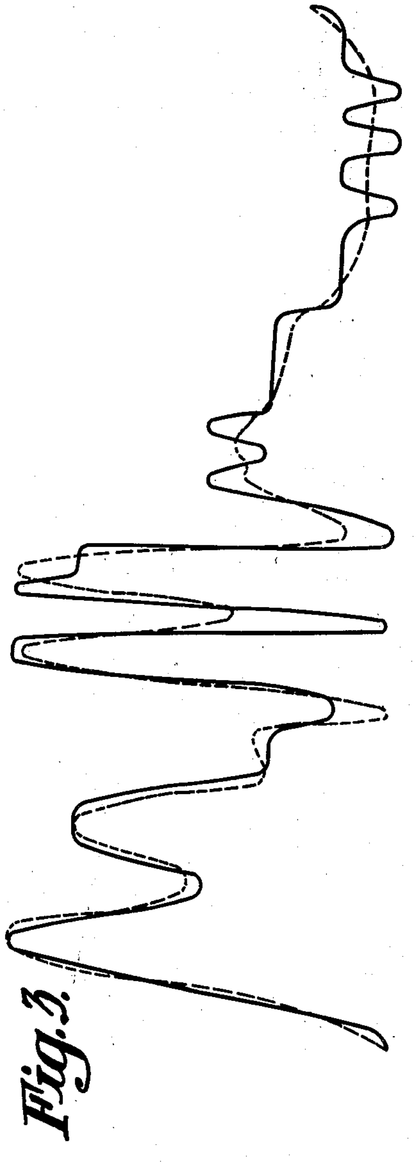

The manner in which these principles are put into practice in transmitters and receivers may best be understood from a detailed description of the drawings in which:

Figure 1 illustrates by block diagram a color television transmitter constructed in accordance with the principles of this invention, Figure 2 illustrates also by block diagram a color television receiver adapted to reproduce colored images from the signals transmitted by apparatus such as shown in Figure 1, and Figure 3 shows an original video signal and the way in which this signal will be reproduced by the transmission system of this invention.

Referring to Figure 1, there is shown a green camera or pick-up tube 1, an amplifier 2, a low-pass filter 3, a gate 4, a differentiator 5, an adder 6, a sampler 7, a quantizer 8, an integrator 9, and another low-pass filter 10 connected in series in the order named. The differentiator may be of any type, but, as illustrated, consists of condenser 11 and resistor 12.

The integrator 9 may be comprised of a series resistor 13 and a condenser 14. In order that the constant of integration may be established, a switch is placed across the condenser 14 and periodically closed so as to discharge the amount of energy in the integrator circuit 9 to a predetermined level. As shown, the switch is comprised of the output circuit of a triode 16 connected in parallel with the condenser 14. Its control grid 17 is biased negatively with respect to ground by the battery 18. A source of blanking pulses 19 is connected in series with the battery 18 so that its positive pulses overcome the bias established by this battery and permit the triode 16 to conduct for the duration of the pulse. A variable resistor 21 may be connected in series with either the condenser 14 or the triode 16, so as to regulate the rate of discharge of energy from the condenser 14. Another way of controlling the amount of energy discharged by the condenser 14 is to provide means for varying the duration of pulses supplied by the source 19. The polarity of the connection of the triode 16 should be such that the plate of the triode 16 is connected to the positive plate of the condenser 14. The purpose of discharging the condenser 14 to a predetermined level will become apparent from a discussion of the overall operation given below.

The red video signals are derived by a red camera 23 and after suitable amount of amplification by an amplifier 24 are passed to a multiplexer 26 via a low-pass filter 27. In a similar way, the blue video signals are derived by a camera 28 and passed to the multiplexer 26 via a series connected amplifier 29 and a low-pass filter 31. The output of the integrator 9 and the output of the multiplexer 26 are added in an adder 34. Signal adders are well known to those skilled in the art and may be comprised of two vacuum tubes having a common load impedance.

The overall operation of the transmitter illustrated in Figure 1 may be described as follows:

The green video signals supplied by the camera 1 are suitably amplified in the amplifier 2 and limited in frequency by the low-pass filter 3 and arrive at the input of the differentiator 5 only during line scanning intervals, as the gate 4 is closed during the normal blanking intervals. Samples of the differentiated green video signals are taken at desired intervals by the sampler 7. The particular shape of the samples or the manner in which they are derived is of no importance to the operation of this invention. However, as will be clear from a consideration of United States application, Serial No. 113,256, filed August 31, 1949, in the names of Szikali and Bedford, now United States Patent No. 2,664,462, issued December 29, 1953, this sampling technique should be employed in any quantizing system wherein it is desired to transmit as much information as possible in a given bandwidth. The samples of green video information are then quantized in the quantizer 8. As the quantizing operation itself sometimes introduces unwanted high frequencies, the output of the quantizer may be passed through another low-pass filter 10, after being integrated in the integrator 9 so as to again produce a signal representative of the intensity of the green video information. However, there will be some discrepancies between this signal and the original signal appearing at the input of the differentiator 5 due to the quantizing operation that has been performed. It should be kept in mind that the quantizing operation was applied to the first derivative of the green video signal and not to the green video signal itself.

The multiplexed red and blue signals, known as the purple signal, is added to the green video signal appearing at the output of the integrator 9 in an adder 34. The relative gains of the amplifiers 24 and 29 in the red and blue video channels respectively with respect to the gain of the amplifier 2 in the green video signal should be adjusted so that the amplitude of the red and blue signals would not exceed one of the quanta levels established by the quantizer 8. For reasons that will become clear when the operation of the receiver of Figure 2 is discussed, it will be at once apparent to those skilled in the art that an attenuator could be used instead of amplifiers. Whatever the means would make no difference, as long as the amplitude and thus the first derivative of the red and blue signals bears the above stated relationship to the amplitude of the smallest quantum level of the quantizer 8.

When a function is integrated, there is usually added what is known as a constant of integration. In this particular case, the constant of integration is the signal level, usually black, that the green video signal achieves during blanking. Therefore, at the beginning of each line, the green video signal appearing at the output of the integrator 9 is established at black level by the discharging action of the triode 16. This eliminates any effect that the green video signals of a previously scanned line might otherwise have. Therefore, as will be apparent, the receiver is capable of starting at a known signal level for the green video signals and by following the first derivative may change the intensity at a rate determined by the quantizer level at which the signal appears.

It would, of course, be possible to differentiate the red and blue video signals and introduce them at a point just before the integrator 9. However, this presents unnecessary complications in view of the fact that after integration in the integrator 9, the red and blue video signals would be restored without any substantial deformation. Therefore, the red and blue video signals may be added to the green video signal in the adder 34 and the same results obtained.

The operation of the correction circuit including the delay line 38, the subtractor 37, and the amplifier 39 will now be explained. The quantizer 8 limits the number of slopes which the integrator 9 can follow in passing from one green intensity level to another. However, the actual slope of the change in the green video signal may not be exactly the same as one of the slopes provided by the quantizer. Therefore, particularly in large areas, the intensity of the green signal at the output of the integrator 9, which would accumulate any such slight discrepancy, may be varied considerably from the true intensity of the green video signal as it was applied to the differentiator 4. In small areas, an error in slope will not produce as much error in intensity because the time during which the integration takes place at any particular slope is smaller. The true green video signal is applied via the delay line 38 to one input of the subtractor 37 and the green video signal at the output of the integrator 9 is supplied via the amplifier 39 to another input terminal of the subtractor 37. As explained previously, the amount of delay provided by the delay line 38 is sufficient to compensate for the amount of delay experienced by the signal as it travels from the output of the gate 4 through the differentiator and the ensuing series network to the input of the subtractor 37. The amplifier 39 has a sufficient number of stages and sufficient gain so that the signal coming from the output of the integrator 9 will be 180° out of phase with the signal supplied by the delay line 38 and of the same nominal amplitude. Actually, the subtractor 37 is an adder with a polarity of one of the signals being reversed, but it makes it clearer to call it a subtractor since its function is to extract the difference between the signal appearing at the output of the delay line and the output of amplifier 39. At any rate, the difference between the true video signal appearing at the input of the differentiator 5 and the integrated video signal appearing at the output of the integrator 9 is applied to an adder 6 through amplifier 40. Thus, if the difference between these two video signals is less than that necessary to change the output of the quantizer 8 by one quantum level, no changes are produced in the integrated video signal at the output of the integrator 9. However, when this difference signal becomes sufficiently large, it causes the output of the quantizer 8 to jump up or down, as the case may be, by one quantum level, and thereby correct the integrated green video signal. The gain of the amplifier 40 should be such that when the quantizer 8 is changed by one quantum level due to the action of the output of the subtractor 37, the integrated signal at the output of the integrator 9 should be brought back to the true value within a predetermined time. The amount of time allotted for this correction could be equal to the time difference between samples provided by the sampler 7 or over a longer period of time, if desired. The correction network, therefore, changes the slope of the intensity so as to continually bring the intensity amplitude back to a true value.

After the signal appearing at the output of the adder 34 in Figure 1 is transmitted, it is detected, as in Figure 2, by any simple detector 41 and applied to a differentiator 42, a sampler 43, a quantizer 44, a low-pass filter 46, and an integrator 47 and its means for reproducing colored images 49, all connected in series. The various units in this series chain are constructed in a manner similar to that discussed in connection with Figure 1. The horizontal synchronizing pulses may be derived from the output of the signal detector 41 by a sync separator 51 in any well known manner. The sync pulses are then employed to trigger pulse generator 52 so as to discharge the condenser of the integrator 47. The pulses thus generated are employed to establish the energy in the integrator 47 at a desired level. As was the case in Figure 1, the pulses are arranged to overcome the bias of a battery and permit a triode to discharge the storage condenser of the integrator for a given length of time.

In order to derive the red and blue multiplex signals, known as the purple signal, a delay line 53 is connected between the output of the signal detector 41 and a subtractor 54. The output of the integrator 47 is connected via a suitable amplifier 48 to the subtractor 54. The difference between these two signals appears on lead 56, and after suitable amplification in an amplifier 57 the purple signal is applied to a demultiplexer 58, which distributes the red video signals to the means 49 for reproducing color images via a lead 59 and the blue signals to the color reproducing means 49 via a lead 61.

The following description is directed to means for improving the operation and preventing a cumulative error. As will become clear from the description of the overall operation, the output of the integrator 9 should very closely resemble the video signal appearing at the output of the gate 4. Any discrepancies between them are derived by employing the original video signal at the output of the gate 4 to a subtractor 37 via a delay line 38 and the output of the integrator 9 to the subtracor 37 via a suitable amplifier 39. The amount of delay in the delay line 38 is adjusted to be equal to the amount of delay in the video signals, especially in traveling from the gate 4 to the output of the integrator 9. The amplifier 39 is adjusted so that the video signals derived at the output of the integrator 9 will have a negative amplitude as compared with the original signal and the gain of the amplifier 39 is adjusted so as to compensate for any loss in gain experienced as the signals pass through the series channel including gate 4 to and including the output of the integrator 9. The difference signal thus derived between the original video signal and the video signal appearing in the output of the integrator 9 is added to the output of the differentiator 5 by coupling it to the adder 6.

In accordance with the disclosure in United States Patent application Serial No. 33,729, filed on June 18, 1948, to Szikali, now U. S. Patent 2,617,879, the difference between the actual signal and the quantized signal, known as the residue, may be used for correction purposes. For example, the amplifier 40 could, if the quantum steps are uniform, be replaced by the correction pulse generator described in the above identified application. Without going into detail, it may be said that the residue signal is stored up until it reaches a given value and, upon reaching this value, a pulse generator is triggered. The output of the pulse generator is combined with the original signals. In this way, the time delays in the circuiting loops may be made less critical.

The following discussion relates to the operation of the receiver as shown in Figure 2. The output of signal detector 41 will be substantially the same as the signal appearing at the output of the adder 34 in Figure 1, wherein the integrated green signal is combined with the multiplexed red and blue video signals, or the purple signal. After differentiation in the differentiator 42, this signal is sampled at proper times in accordance with sampling theory so that the value of the samplers applied to the quantizer 44 are correct. As in the transmitter in Figure 1, the quantizer can provide samples of certain discrete amplitudes via the low-pass filter 46 to the integrator 47. The larger the voltage applied to the integrator 47, the sooner its output reaches a predetermined value. Therefore, when the slope is steep, the voltage applied to the integrator 47 is large and the change in the integrated wave takes place rapidly. This integrated wave represents the green intensity signal and it should be substantially identical with the integrated green video wave appearing at the output of the integrator 9 in the transmitter of Figure 1.

The signal output of the detector 41 includes the purple signals whereas the output of the integrator 9 in the transmitter only includes green video information. It will be remembered that the relative gains of the amplifiers 24 and 29 in the red and blue video signals respectively with respect to the gain of the amplifier 2 in the green video signal are so arranged that the amplitude of the purple signal supplied to the adder 34 could never be greater than that signal obtained if the purple signal were first differentiated and the amplitude of the first derivative limited to a quantum level at the output of the quantizer 8. Thus, the added purple signal has never sufficient amplitude when differentiated in the differentiator 42 at the receiver to cause the quantizer 44 to change by one quantum level. Actually, the output of the quantizer only follows the green video information and is not affected in any way by the purple or, that is, the red and blue video information. Thus, the purple signal including the red and blue video information may be derived by the integrated green signal appearing at the output of the integrator 47 from the total video signal appearing at the output of the signal detector 41. The total signal is delayed by the delay line 53 by a sufficient amount to compensate for the delay produced in the integrated green video signal as it passed through the differentiator, the sampler, the quantizer, the low-pass filter and the integrator. The gain of the amplifier 48 is such as to compensate for any loss in gain in the green video signal as it traverses this same chain of apparatus. There is a sufficient number of stages in the amplifier 48 so that the integrated green video signal is applied to the subtractor 54 in opposite phase relationship to the component of the green video signal appearing in the total signal appearing at the output of the delay line 53. Thus, the output of the subtractor 54 represents the subtraction of the total video signal minus the green video signal, thus leaving the purple video signal. The demultiplexer 58 distributes the red video signals to one output lead 59 and the blue video signals to the other output lead 61.

As is well known in mathematics, any given signal can be represented by complex variables having real and imaginary components. Thus, the way in which these two variables vary as a function of the frequency of a signal can be represented by a three dimensional figure in which the real variables are plotted along one axis, the imaginary variables along another, and the amplitudes along a third of a set of mutually perpendicular axes. As one proceeds out from the junction of the axes, the frequency can be increased. Differentiation is only one way of altering the phase and amplitude versus frequency characteristics of a signal.

Having thus described my invention what is claimed is:

1. In a signal-transmission bandwidth-reduction apparatus adapted to receive an input signal, the combination comprising differentiating means having a time constant which will provide differentiation of a signal wave over a range of frequencies from the highest frequency to be passed therethrough to a lower frequency determined by the point on the amplitude versus frequency characteristic of said differentiator at which the signal wave is still usable over the ambient noise, means to apply the input signal to said differentiating means for developing a signal which is representative of the derivative of said input signal, quantizing means for converting a continuous-signal wave into a stepped wave having a plurality of discrete amplitude levels, and means connecting said quantizing means to said differentiating means for producing a stepped wave corresponding to said derivative signal in which a change in amplitude of said stepped wave occurs each time the derivative signal amplitude passes through one of said discrete amplitude levels.

2. In a signal-transmission bandwidth-reduction apparatus adapted to receive an input signal, the combination comprising differentiating means having a time constant which will provide differentiation of a signal wave over a range of frequencies from the highest frequency to be passed therethrough to a lower frequency determined by the point on the amplitude versus frequency characteristic of said differentiator at which the signal wave is still usable over the ambient noise, means to apply the input signal to said differentiating means for developing a signal which is representative of the derivative of said input signal, quantizing means for converting a continuous-signal wave into a stepped wave having a plurality of discrete amplitude levels, means connecting said quantizing means to said differentiating means for producing a stepped wave corresponding to said derivative signal in which a change in amplitude of said stepped wave occurs each time the derivative signal amplitude passes through one of said discrete amplitude levels, integrating means for converting signal amplitude values into a signal having slope values proportional to said amplitude values, means connecting said integrating means to said quantizing means for converting said stepped wave corresponding to said derivative signal into a slope-value signal having slopes proportional to the corresponding discrete amplitude values of said stepped wave, and means for comparing said slope-value signal with said input signal thereby to produce an error signal representative of the difference between said slope-value signal and said input signal, said means connecting said quantizing means to said differentiating means including adder means for adding said error signal to said derivative signal thereby to improve the accuracy of said slope-value signal.

References Cited in the file of this patent

UNITED STATES PATENTS

| | | |
|---|---|---|
| 2,311,021 | Blumlein | Feb. 16, 1943 |
| 2,437,027 | Homrighous | Mar. 2, 1948 |
| 2,521,733 | Lesti | Sept. 21, 1950 |
| 2,527,638 | Kreer et al. | Oct. 31, 1950 |
| 2,605,361 | Cutler | June 29, 1952 |
| 2,610,295 | Carbrey | Sept. 9, 1952 |
| 2,617,879 | Sziklai | Nov. 11, 1952 |
| 2,632,058 | Gray | Mar. 17, 1953 |
| 2,640,965 | Eaglesfield | June 2, 1953 |
| 2,662,118 | Schouten et al. | Dec. 8, 1953 |
| 2,669,608 | Goodall | Feb. 16, 1954 |
| 2,686,869 | Bedford | Aug. 17, 1954 |

OTHER REFERENCES

"Line by Line Black-Level Control of Television Signals," by N. N. Parker Smith, The Marconi Review, 2nd quarter, 1950.